United States Patent [19]

Butterfass et al.

[11] Patent Number: 5,922,434
[45] Date of Patent: Jul. 13, 1999

[54] PRODUCTION OF MULTI-PLY PRODUCTS USING AN ADHESION PROMOTER

[75] Inventors: Dieter Butterfass, Böhl-Iggelheim, Germany; Guy Frederic Mori, Schiltigheim, France; Kai Olfermann, Kaiserslautern, Germany

[73] Assignee: BASF Aktiengesellschaft, Ludwigshafen, Germany

[21] Appl. No.: 08/675,831

[22] Filed: Jul. 5, 1996

[30] Foreign Application Priority Data

Jul. 11, 1995 [DE] Germany ............... 195 25 250

[51] Int. Cl.⁶ ............... B32B 3/02; A46D 1/00; D05C 15/00
[52] U.S. Cl. ............... 428/95; 428/97; 156/72; 427/208.2
[58] Field of Search ............... 428/95, 97; 156/72; 427/208.2

[56] References Cited

U.S. PATENT DOCUMENTS 5,332,773 7/1994 Baker .
5,380,574 1/1995 Katoh et al. ............... 428/95

*Primary Examiner*—Terrel Morris
*Attorney, Agent, or Firm*—Oblon, Spivak, McClelland, Maier & Neustadt, P.C.

[57] ABSTRACT

The use of a copolymer consisting in polymerized form of a) from 70 to 90% by weight of at least one $C_2$–$C_4$-olefin and b) from 10 to 30% by weight of at least one monomer selected from the group consisting of α,β-monoethylenically unsaturated $C_3$–$C_8$-monocarboxylic acids, α,β-monoethylenically unsaturated $C_4$–$C_8$-dicarboxylic acids and anhydrides of these mono- and dicarboxylic acids, as adhesion promotor between a first and a second material, the first material comprising not more than 70% by weight of at least one $C_2$–$C_4$-olefin in polymerized form and the second material comprising not less than 70% by weight of at least one $C_2$–$C_4$-olefin in polymerized form.

20 Claims, No Drawings

PRODUCTION OF MULTI-PLY PRODUCTS USING AN ADHESION PROMOTER

In many fields there is a need for a solution to the problem of how to superpose a plurality of extended layers of different materials and join them together permanently. This problem is particularly pressing in the art of the construction of floor coverings from a plurality of layers or plies.

The present invention accordingly concerns a process for producing multi-ply products using an adhesion promotor between two layers to be joined together and the use of certain adhesion promotors. The present invention finally concerns floor coverings with appropriately bonded plies.

The problem of the invention will now be more particularly described with reference to the manufacture of tufted carpets. The fabrication of tufted carpet involves tufting, ie. drawing, a yarn or yarn bundle through a base fabric and then fixing it in the base material by applying a binder. This binder generally contains polymers containing an appreciable proportion of copolymers of butadiene-styrene, butadiene-acrylonitrile, butadiene-acrylonitrile-styrene, (meth)acrylic ester-styrene, (meth)acrylic ester-vinyl acetate, methacrylic ester-acrylic ester, (meth)acrylic ester-styrene-acrylonitrile, ethylene-vinyl acetate or else polyurethanes. The binder is preferably brushed onto the base material as an aqueous dispersion and then dried.

To improve the springiness and also the thermal and acoustic insulation of carpets, a textile backing is generally laminated, ie. adhered, to a prefabricated textile covering. This is frequently done by applying polyethylene to the binder in powder form and then melting it. The polyethylene generally adheres well to the textile backing, but the adhesion to the binder is frequently quite inadequate. An adverse consequence is the delamination of parts of the backing, especially from floor coverings in high traffic areas.

The manufacture of tufted carpets is extensively described in DE 41 11 455 and DE 41 40 580 and EP 538 625, EP 547 533 and EP 595 063. EP 595 063 proposes a polyamide-containing adhesive with unmelted fibers for laminating the textile backing to the base layer. The primary objective in said reference appears to be improved recyclability of the carpet manufactured from different materials. U.S. Pat. No. 5,332,773 mentions, as genuine adhesion promotors between tufted base material and backing, mixtures including ethylene-vinyl acetate copolymers, inter alia. However, the proposed laminants or adhesion promoters fall a long way short of achieving the requirements of floor coverings in high traffic areas.

Needlefelt floor coverings give rise to similar problems as tufted carpets. The adhesion between the base material and the frequently highly polyolefin-containing or polyethylene-layered bottom surface is generally likewise completely inadequate.

Such adhesion problems also arise with other technical applications where corresponding assembled layers have to be bonded together permanently.

It is an object of the present invention to provide a process for producing multi-ply products, in particular carpets in which at least one ply is polyolefin-containing, with the aid of an adhesion promotor. More particularly, an adhesion promotor is to be provided for the permanent bonding of polyethylene and plies containing copolymers of butadiene-styrene, acrylic ester-styrene, butadiene-acrylonitrile, acrylic ester-vinyl acetate, methacrylic ester-acrylic ester or polyurethane. A further object is the provision of floor coverings possessing good inter-ply adhesion.

We have found that these objects are achieved by the claimed use of a certain copolymer as adhesion promotor.

The present invention accordingly provides for the use of a copolymer consisting in polymerized form of a) from 70 to 90% by weight of at least one $C_2$–$C_4$-olefin and b) from 10 to 30% by weight of at least one monomer selected from the group consisting of $\alpha,\beta$-monoethylenically unsaturated $C_3$–$C_8$-monocarboxylic acids, $\alpha,\beta$-monoethylenically unsaturated $C_4$–$C_8$-dicarboxylic acids and anhydrides of these mono- and dicarboxylic acids, as adhesion promotor between a first and a second material, the first material comprising not more than 70% by weight of at least one $C_2$–$C_4$-olefin in polymerized form and the second material comprising not less than 70% by weight of at least one $C_2$–$C_4$-olefin in polymerized form.

Preferred olefin monomers for component a) are ethylene and/or propylene and also mixtures of $C_2$–$C_4$-olefins with other olefins, in particular mixtures of ethylene with up to 10 mol % of higher monoolefins, for example hexene or octene.

Preference is given to using a copolymer wherefor at least one monomer b) is selected from the group consisting of $\alpha,\beta$-monoethylenically unsaturated $C_3$–$C_5$-monocarboxylic acids, $\alpha,\beta$-monoethylenically unsaturated $C_4$–$C_5$-dicarboxylic acids and anhydrides of these mono- and dicarboxylic acids. Preference is further given to selecting a monomer b) from the group consisting of acrylic acid, maleic acid and its anhydride. Particularly preferred copolymers are ethylene-acrylic acid copolymers.

A substance particularly suitable for use as adhesion promotor for the purposes of the present invention is the polymer dispersion available from BASF® under the trade names of Epotal® DS 4024 X and Poligen® WE 3.

Preferred copolymers have a weight average molecular weight of from 15000 to 25000. Their melt viscosity is preferably from 10 to 150 Pas. These viscosity values were measured at 200° C. and 600 rpm using an MC 10 instrument from Physica in a Couette arrangement with a shearing gap from 0.6 mm and a length of 21 mm.

A particularly advantageous adhesion promotion is achieved when the first material comprises not less than 50% by weight of at least one polymer selected from the group consisting of polyurethanes and copolymers constructed in polymerized form of not less than 90% by weight of one of the following monomer pairs or monomer triplets: butadiene-styrene, butadiene-acrylonitrile, butadiene-acrylonitrile-styrene, (meth)acrylic ester-styrene, (meth)acrylic ester-vinyl acetate, methacrylic ester-acrylic ester, (meth)acrylic ester-styrene-acrylonitrile, ethylene-vinyl acetate, the (meth)acrylic esters being preferably the esters of $C_1$–$C_8$-alkanols, in particular of n-butanol, 2-ethylhexanol, methanol and ethanol.

The result is advantageous even when the first material comprises at least 5% by weight of at least one polymer compound having at least one acid group, in particular a carboxyl group, or an amide group. The acid groups can also be present partly or wholly neutralized. Suitable neutralizing agents are alkali metal hydroxides, amines and in particular ammonia.

The present invention also provides a process for producing multi-ply products from a first material, an adhesion promotor and a second material by applying the adhesion promotor to an area of the first material comprising not more than 70% by weight of at least one $C_2$–$C_4$-olefin in polymerized form and contacting the area thus treated with the second material comprising not less than 70% by weight of at least one $C_2$–$C_4$-olefin in polymerized form, which comprises using an adhesion promotor that is a copolymer consisting in polymerized form of a) from 70 to 90% by weight of at least one $C_2$–$C_4$-olefin and
b) from 10 to 30% by weight of at least one monomer selected from the group consisting of α,β-monoethylenically unsaturated $C_3$–$C_8$-monocarboxylic acids, α,β-monoethylenically unsaturated $C_4$–$C_8$-dicarboxylic acids and anhydrides of these mono- and dicarboxylic acids.

Preferably the process employs for the adhesion promotor a copolymer in which at least one monomer b) is selected from the group consisting of α,β-monoethylenically unsaturated $C_3$–$C_5$-monocarboxylic acids, α,β-monoetylenically unsaturated $C_4$–$C_5$-dicarboxylic acids and anhydrides of these mono- and dicarboxylic acids. Preference is further given to a monomer b) selected from the group consisting of acrylic acid, maleic acid and its anhydride. Particularly preferred copolymers are ethylene-acrylic acid copolymers.

In a preferred process, the copolymer has a weight average molecular weight of from 15000 to 25000. The copolymer preferably has a melt viscosity of from 10 to 150 Pas, determined by the above-specified method.

Advantageous results are obtained with the process of the present invention in particular by using a first material comprising not less than 50% by weight of at least one polymer selected from the group consisting of polyurethanes and copolymers constructed in polymerized form of not less than 90% by weight of one of the following monomer pairs or monomer triplets: butadiene-styrene, butadiene-acrylonitrile, butadiene-acrylonitrile-styrene, (meth)acrylic ester-styrene, (meth)acrylic ester-vinyl acetate, methacrylic ester-acrylic ester, (meth)acrylic ester-styrene-acrylonitrile, ethylene-vinyl acetate, the (meth)acrylic esters being preferably the esters of $C_1$–$C_8$-alkanols, in particular of n-butanol, 2-ethylhexanol, methanol and ethanol.

The result of the process is advantageous even when the first material comprises at least 5% by weight of at least one polymer compound having at least one acid group, in particular a carboxyl group, or an amide group. The acid groups may also be present partly or wholly neutralized. Suitable neutralizing agents are alkali metal hydroxides, amines and in particular ammonia.

Preference is given to a process where the adhesion promotor is applied as a low melting powder or as an aqueous polymer dispersion. The preparation of appropriate aqueous polymer dispersions is known and described in EP 024 034, DE 34 20 168 and U.S. Pat. No. 4,613,679. Preference is given to applying the adhesion promotor in an amount of from 0.1 to 1000 g/m², preferably from 20 to 50 g/m². The add-on weights are based on the dry weight of the add-on. The application to the textile substrate can take the form of spraying, foam application, padding, knife-coating or printing.

The present invention provides in particular a process wherein a textile support material, in particular a carpet, provided with a primary backing (first material, precoat) is bonded by means of one of the adhesion promotors described to a secondary backing, in particular to a textile secondary backing. In this process, either the polyolefin-containing secondary backing is itself the second material, or a polyethylene, polypropylene, ethylene-propylene-diene copolymer layer or a similar highly polyolefin-containing layer is applied to the secondary backing. The precoat consists of the customary polymer dispersions, for example of butadiene-styrene copolymers and the other abovementioned preferred first materials. The precoat is customarily applied as an aqueous dispersion, optionally filled with fillers such as chalk, aluminum trihydrate or barium sulfate. The precoat may also contain antistats and further flame-proofing agents, for example phosphoric ester derivatives and salts of lower carboxylic acids having hygroscopic properties.

The present invention also provides a floor covering comprising a layer of a first material and a layer of a second material bonded together by means of an adhesion promotor, the first material comprising not more than 70% by weight of at least one $C_2$–$C_4$-olefin in polymerized form and the second material comprising not less than 70% by weight of at least one $C_2$–$C_4$-olefin in polymerized form, wherein the adhesion promotor is a copolymer consisting in polymerized form of a) from 70 to 90% by weight of at least one $C_2$–$C_4$-olefin and
b) from 10 to 30% by weight of at least one monomer selected from the group consisting of α,β-monoethylenically unsaturated $C_3$–$C_8$-monocarboxylic acids, α,β-monoethylenically unsaturated $C_4$–$C_8$-dicarboxylic acids and anhydrides of these mono- and dicarboxylic acids.

Preference is given to a floor covering wherein the adhesion promotor used comprises at least one monomer b) is selected from the group consisting of α,β-monoethylenically unsaturated $C_3$–$C_5$-monocarboxylic acids, α,β-monoethylenically unsaturated $C_4$–$C_5$-dicarboxylic acids and anhydrides of these mono- and dicarboxylic acids. Preference is further given to a monomer b) selected from the group consisting of acrylic acid, maleic acid and its anhydride. Particularly preferred copolymers are ethylene-acrylic acid copolymers.

Preferably the copolymer used as adhesion promotor has a weight average molecular weight of from 15000 to 25000. This copolymer preferably has a melt viscosity of from 10 to 150 Pas, measured as described above.

Particular advantages with respect to the adhesion of the two materials are offered by the floor covering whose first material comprises not less than 50% by weight of at least one polymer selected from the group consisting of polyurethanes and copolymers constructed in polymerized form of not less than 90% by weight of one of the following monomer pairs or monomer triplets: butadiene-styrene, butadiene-acrylonitrile, butadiene-acrylonitrile-styrene, (meth)acrylic ester-styrene, (meth)acrylic ester-vinyl acetate, methacrylic ester-acrylic ester, (meth)acrylic ester-styrene-acrylonitrile, ethylene-vinyl acetate, the (meth)acrylic esters being preferably the esters of $C_1$–$C_8$-alkanols, in particular of n-butanol, 2-ethylhexanol, methanol and ethanol.

Also of particular advantage is a floor covering comprising a first material comprising at least 5% by weight of at least one polymer compound having at least one acid group, in particular a carboxyl group, or an amide group. The acid groups may also be present partly or completely neutralized. Suitable neutralizing agents are alkali metal hydroxides, amines and in particular ammonia.

Very particular preference for the purposes of the present invention is given to a floor covering wherein a tufted carpet support material having a primary backing is bonded by means of one of the adhesion promoters described to a secondary backing, in particular to a textile secondary backing.

EXAMPLES

First, polyester spunbond support materials tufted with polyamide fibers were each consolidated with a precoat (first material) comprising a known aqueous, usually carboxylated, polymer dispersion with or without fillers. The support materials thus treated were dried at 130° C. in a laboratory drying cabinet. The precoat was besprinkled with a polyethylene powder, here Lupolen® 2410 T Q 276, in an amount of about 250 g/m² (second material).

The raw state weight of the tufted support materials was about 1000 g/m², the add-on weight of the precoat was generally about 800 g/m² dry (cf. Table I). The precoat contained chalk or aluminum trihydrate as filler (cf. Table I).

To prepare comparative examples to represent the prior art, a textile backing, generally a polyester needlefelt, was laminated in place as an underlayer after heating this powder with an infrared radiator.

In the examples according to the present invention, the application of the polyethylene layer was preceded by foaming Poligen® WE 3 as adhesion promotor onto the precoat in an amount of 25 g/m² dry and drying it at 130° C. Poligen® WE 3 is an aqueous dispersion of ethylene-acrylic acid copolymers. This aqueous dispersion has a DIN 53211 viscosity within the range from 15 to 60 s.

Finally, the adhesion between precoat and the polyethylene firmly adhering to the textile backing was determined at 23° C. and 50% relative humidity using a tensile tester from Zwick (Ulm, Germany) of type 1425. The results are shown in Table I.

ethylene layer firmly adherent thereto could be detached from the precoat and the tufted base material firmly bonded thereto using forces of around 10 to 30 N/5 cm, depending on the nature of the precoat dispersion used, the room temperature delamination trials were unsuccessful in the case of tufted carpets produced according to the present invention. High forces would cause the textile backing to rip off.

We claim:

1. A process for producing multi-ply products, comprising:

applying an adhesion promoter to a precoated first material, said first material comprising not less than 50% by weight of at least one polymer selected from the group consisting of polyurethanes and copolymers constructed in polymerized form of not less than 90% by weight of one of the following monomer pairs or monomer triplets; butadiene-styrene, butadiene-acrylonitrile, butadiene-acrylonitrile-styrene, (meth) acrylic ester-styrene, (meth)acrylic ester-vinyl acetate, (meth)acrylic ester-acrylic ester, (meth)acrylic ester-styrene-acrylonitrile, ethylene-vinyl acetate, the (meth) acrylic esters being the esters of $C_1$–$C_8$-alkanols, and contacting the first material with a second material, said second material comprising not less than 70% by weight of at least one $C_2$–$C_4$-olefin in polymerized form, wherein

| No. | Precoat (in g/m² dry) on tufting raw state material (1000 g/m²) | Filler in precoat, type and amount (in % based on weight of polymer in precoat) | Polyolefin layer laminating layer PE-LD powder | Textile backing | Adhesion dry/across N/5 cm | |
|---|---|---|---|---|---|---|
| | | | | | without adhesion promotor | with adhesion promotor Poligen WE3 25 g/m² dry |
| 1 | Butadiene-styrene Styrofan ® LD 417 800 g/m² | Aluminum trihydrate (= ATH) 300% | Lupolen ® 2410 T Q 276 powder 250 g/m² | Polyester needlefelt | 16 | >100 |
| 2 | Butadiene-styrene Styrofan ® LD 417 800 g/m² | Chalk W 12 300% | Lupolen ® 2410 T Q 276 powder 250 g/m² | Polyester needlefelt | 28 | >100 |
| 3 | Butadiene-styrene Styrofan ® LD 417 800 g/m² | ATH 300% | Lupolen ® 2410 T Q 276 powder 250 g/m² | Malimo stitch-bond 100% poly-propylene | 9 | >100 |
| 4 | Butadiene-styrene Styrofan ® LD 417 300 g/m² | None | Lupolen ® 2410 T Q 276 powder 250 g/m² | Polyester needlefelt | 20 | >100 |
| 5 | Butylacrylate-styrene-acrylonitrile Acronal ® S 360 D 800 g/m² | ATH 300% | Lupolen ® 2410 T Q 276 powder 250 g/m² | Polyester needlefelt | 15 | >100 |
| 6 | Butadiene-acrylonitrile Butofan ® 440 D 800 g/m² | ATH 300% | Lupolen ® 2410 T Q 276 powder 250 g/m² | Polyester needlefelt | 23 | >100 |
| 7 | Butylacrylate-vinyl acetate Acronal ® 500 D 800 g/m² | ATH 300% | Lupolen ® 2410 T Q 276 powder 250 g/m² | Polyester needlefelt | 19 | >100 |
| 8 | Methyl methacrylate-butyl acrylate Acronal ® 18 D 800 g/m² | ATH 300% | Lupolen ® 2410 T Q 276 powder 250 g/m² | Polyester needlefelt | 28 | >100 |
| 9 | Polyurethane Emuldur ® DS 2299 800 g/m² | None | Lupolen ® 2410 T Q 276 powder 250 g/m² | Polyester needlefelt | 21 | >100 |
| 10 | Ethylene-vinyl acetate 800 g/m² | ATH 300% | Lupolen ® 2410 T Q 276 powder 250 g/m² | Polyester needlefelt | 13 | >100 |

Whereas in the case of the comparative specimens without adhesion promotor the textile backing layer with the polysaid adhesion promoter is a copolymer comprised in polymerized form of:

a) 70 to 90% by weight of at least one $C_2$–$C_4$-olefin and
b) 10 to 30% by weight of at least one monomer selected from the group consisting of α,β-monoethylenically unsaturated $C_3$–$C_8$ monocarboxylic acids, α,β-monoethylenically unsaturated $C_4$–$C_8$-dicarboxylic acids, and anhydrides thereof, and wherein said first material is precoated with a precoat comprising a polymer and a filler.

2. A process as claimed in claim 1 wherein at least one monomer b) is selected from the group consisting of acrylic acid, maleic acid and its anhydride.

3. A process as claimed in claim 1 wherein the copolymer is an ethylene-acrylic acid copolymer.

4. A process as claimed in claim 1 wherein the first material comprises at least 5% by weight of at least one polymer compound having at least one acid group or an amide group.

5. A process as claimed in claim 1 wherein the adhesion promotor is applied as a low melting powder or as an aqueous polymer dispersion.

6. A process as claimed in claim 1 wherein the adhesion promotor is applied in an amount of from 0.1 to 1000 g/m$^2$, based on the dry weight.

7. A process as claimed in claim 1, wherein said first material is a primary backing on a textile support material, and said second material is a secondary backing for said textile support material.

8. A process as claimed in claim 1, wherein said filler is selected from the group consisting of chalk, aluminum trihydrate and barium sulfate.

9. A process as claimed in claim 1, wherein said said filler is present in the precoat in an amount of 300% by weight, based on the weight of the polymer.

10. A floor covering, comprising:

a layer of a precoated first material and a layer of a second material bonded together by means of an adhesion promoter, wherein the first material comprises not less than 50% by weight of at least one polymer selected from the group consisting of polyurethanes and copolymers constructed in polymerized form of not less than 90% by weight of one of the following monomer pairs or monomer triplets; butadiene-styrene, butadiene-acrylonitrile, butadiene-acrylonitrile-styrene, (meth)acrylic ester-styrene, (meth)acrylic ester-vinyl acetate, (meth)acrylic ester-acrylic ester, (meth)acrylic ester-styrene-acrylonitrile, ethylene-vinyl acetate, the (meth)acrylic esters being the esters of $C_1$–$C_8$-alkanols, and said second material comprises not less than 70% by weight of at least one $C_2$–$C_4$-olefin in polymerized form, wherein said adhesion promoter is a copolymer comprised in polymerized form of:
a) 70 to 99% by weight of at least one $C_2$–$C_4$-olefin and
b) 10 to 30% by weight of at least one monomer selected from the group consisting of α,β-monoethylenically unsaturated $C_3$–$C_8$-monocarboxylic acids, α,β-monoethylenically unsaturated $C_4$–$C_8$-dicarboxylic acids, and anhydrides thereof, and wherein said first material is precoated with a precoat comprising a polymer and a filler.

11. A floor covering as claimed in claim 10 wherein at least one monomer b) is selected from the group consisting of acrylic acid, maleic acid and its anhydride.

12. A floor covering as claimed in claim 10 wherein the copolymer is an ethylene-acrylic acid copolymer.

13. A floor covering as claimed in claim 10 wherein the first material comprises at least 5% by weight of at least one polymer compound having at least one acid group, in particular a carboxyl group, or an amide group.

14. A floor covering as claimed in claim 10, wherein said first material is a primary backing on a tufted carpet support material and said second material is a secondary backing for said tufted carpet support material.

15. A floor covering as claimed in claim 10, wherein said filler is selected from the group consisting of chalk, aluminum trihydrate, and barium sulfate.

16. A floor covering as claimed in claim 10, wherein said filler is present in an amount of 300% by weight, based on the weight of the polymer.

17. The floor covering as claimed in claim 10, wherein said b) is at least one monomer selected from the group consisting of α,β-monoethylenically unsaturated $C_3$–$C_5$ monocarboxylic acids and anhydrides thereof.

18. The floor covering as claimed in claim 10, wherein said b) is at least one monomer selected from the group consisting of α,β-monoethylenically unsaturated $C_4$–$C_5$-dicarboxylic acids and anhydrides thereof.

19. A process as claimed in claim 6, wherein said adhesion promoter is applied in an amount of 20–50 g/m$^2$, based on the dry weight.

20. A floor covering, comprising:

a layer of a precoated first material and a layer of a second material bonded together by means of an adhesion promoter, wherein said first material comprises not less than 50% by weight of at least one polymer selected from the group consisting of polyurethanes and copolymers, said copolymers containing not less than 90% by weight of a polymer selected from the group consisting of butadiene-styrene, butadiene-acrylonitrile, butadiene-acrylonitrile-styrene, (meth)acrylic ester-styrene, (meth)acrylic ester-vinyl acetate, (meth)acrylic ester-acrylic ester, (meth)acrylic ester-styrene-acrylonitrile, ethylene-vinyl acetate, and mixtures thereof, the esters being selected from the group consisting of esters of n-butanol, 2-ethylhexanol, methanol, and ethanol; and said second material comprises not less than 70% by weight of at least one $C_2$–$C_4$-olefin in polymerized form, wherein said adhesion promoter is a copolymer comprised in polymerized form of:
a) 70–90% by weight of at least one $C_2$–$C_4$-olefin and
b) 10–30% by weight of at least one monomer selected from the group consisting of α,β-monoethylenically unsaturated $C_3$–$C_8$ monocarboxylic acids, α,β-monoethylenically unsaturated $C_4$–$C_8$-dicarboxylic acids, and anhydrides thereof, and wherein said first material is precoated with a precoat, said precoat comprising a polymer and a filler.

* * * * *